United States Patent

Hottinen et al.

Patent Number: 6,167,038
Date of Patent: Dec. 26, 2000

[54] DATA TRANSMISSION METHOD, AND A CELLULAR RADIO SYSTEM

[75] Inventors: Ari Hottinen, Vantaa; Hannu Häkkinen, Espoo; Kari Rikkinen, Oulu, all of Finland

[73] Assignee: Nokia Telecommunications Oy, Espoo, Finland

[21] Appl. No.: 09/029,763
[22] PCT Filed: Aug. 31, 1995
[86] PCT No.: PCT/FI95/00464
§ 371 Date: Dec. 10, 1998
§ 102(e) Date: Dec. 10, 1998
[87] PCT Pub. No.: WO97/08862
PCT Pub. Date: Mar. 6, 1997
[51] Int. Cl.[7] .................................................. H04B 7/216
[52] U.S. Cl. ........................ 370/335; 375/141; 455/434
[58] Field of Search ..................................... 370/335, 334, 370/342, 328, 329, 336, 341, 343, 345, 344, 337, 330, 347, 18; 375/350, 344, 331, 349, 340, 342, 209, 205, 140, 141, 146, 147; 455/524, 456, 435, 63, 226.1, 434, 562, 437, 440

[56] References Cited

U.S. PATENT DOCUMENTS

| | | | |
|---|---|---|---|
| 5,373,502 | 12/1994 | Turban | 370/18 |
| 5,410,568 | 4/1995 | Schilling | 375/205 |
| 5,442,662 | 8/1995 | Fukasawa et al. | 375/205 |
| 5,778,316 | 7/1998 | Persson et al. | 455/434 |
| 5,933,423 | 8/1999 | Laakso et al. | 370/335 |

FOREIGN PATENT DOCUMENTS

658 991   6/1995   European Pat. Off. .

*Primary Examiner*—Wellington Chin
*Assistant Examiner*—Prenell Jones
*Attorney, Agent, or Firm*—Pillsbury Madison & Sutro Intellectual Property

[57] ABSTRACT a data transmission method in a cellular radio system is provided. Each cell in a cellular radio system includes at least one base station and a number of subscriber terminal equipment connected to the at least one base station. A transmitter includes a mechanism for multiplying a signal of each user by a plurality of pseudorandom sequences. To enable high spectral efficiency and advantageous interference cancellation, a transceiver is provided which includes a mechanism for multiplying a signal of a user by a plurality of pseudorandom sequences. The transmitter further includes a mechanism for transmitting signals of different users multiplied by a same one of the pseudorandom sequences, distinguished from each other by use of time division.

15 Claims, 3 Drawing Sheets

DATA TRANSMISSION METHOD, AND A CELLULAR RADIO SYSTEM

This application is the national phase of international application PCT/FI95/00464, filed Aug. 31, 1995 which designated the U.S.

FIELD OF THE INVENTION

The invention relates to a data transmission method in a cellular radio system, comprising in each cell at least one base station, and a number of subscriber terminal equipment connected to one or more base stations, in which system the signal of each user is multiplied by one or more pseudorandom sequences.

BACKGROUND ART

The present invention is suited for use in particular in cellular radio systems utilizing code division multiple access. Code Division Multiple Access, CDMA is a multiple access method, which is based on the spread spectrum technique, and which has been applied recently in cellular communication systems, in addition to the prior FDMA and TDMA methods. CDMA has several advantages over the prior methods, such as spectral efficiency and the simplicity of frequency planning.

In CDMA, the narrow-band data signal of the user is multiplied to a relatively wide band by means of a spreading code having a remarkably broader band than the data signal. Bandwidths used in known test systems are e.g. 1.25 MHz, 10 MHz and 25 MHz. In connection with the multiplication, the data signal spreads onto the whole of the band used. All users transmit simultaneously by using the same frequency band. An individual spreading code is used on each connection between the base station and the mobile station, and the signals of the users may be distinguished from each other in the receivers on the basis of the spreading code of each user. A CDMA transmission in accordance with prior art is illustrated in FIG. 1, in which the horizontal axis represents time and the vertical axis pseudorandom codes. Transmissions 100–106 of different users are simultaneously transmitted on the same frequency distinguished with different codes. It is also known to provide a user with more than one code, but this is made for increasing the data transfer rate. Then a user who has been provided with two spreading codes, for example, may multiply part of his symbols to be transmitted by one code and part by another code, and thus accomplish a double transmission capacity as compared with a user transmitting with one code.

Adapted filters in the receivers are synchronized with the desired signal, which is identified on the basis of the spreading code. The data signal is returned in the receiver onto the original band by multiplying it by the same spreading code as in connection with the transmission. The signals which have been multiplied by some other spreading code neither correlate nor return to the narrow band in an ideal case. They thus appear as noise from the point of view of the desired signal. It is endeavoured to select the spreading codes of the system so that they are not mutually correlated, in other words, they are orthogonal. In practice, the spreading codes are not non-correlated, and the signals of other users complicate the detection of the desired signal by distorting the received signal. This interference caused by the users for each other is termed as multiple access interference.

The quality of the transmission depends on the number of users, in particular in the direction of transmission from the base station to the terminal equipment. The more users there are in the system, the higher is the power the base station must use for transmission. This generates interference to surrounding cells.

It is previously known to carry out interference cancellation for the received signal with the aid of which cancellation e.g. the quality of the received signal may be improved. Heretofore, plans have been made to use interference cancellation methods mainly at the base stations, since the processing required at the terminal equipment has been too complicated to implement.

SUMMARY OF THE INVENTION

The object of the present invention is thus to implement a data transmission method, with the aid of which the spectral efficiency may further be improved, in particular in the direction of transmission from the base station to the terminal equipment. The aim of the invention is further to implement a data transmission method with the aid of which interference cancellation methods may advantageously be applied in subscriber terminal equipments, as well. Another aim of the invention is to implement a data transmission method with the aid of which the implementation of macrodiversity is simpler than heretofore.

This is achieved with the method of the kind set forth in the introduction, which is characterized in that the signal of the user is multiplied by more than one pseudorandom sequences, the data transfer rate of the signal substantially remaining the same, and that the signals of different users multiplied by the same pseudorandom sequences are distinguished from each other by means of time-division.

Another object of the invention is a cellular radio system, comprising in each cell at least one base station, and a number of subscriber terminal equipments connected to one or more base stations, the transmitter of said system comprising means for multiplying the signal of each user by one or more pseudorandom sequences. The cellular radio system of the invention is characterized in that the transceiver of the system comprises means for multiplying the signal of the user by more than one pseudorandom sequences, the data transfer rate of the signal substantially remaining the same, and that the transmitter comprises means for transmitting the signals of different users multiplied by the same pseudorandom sequences, distinguished from each other by means of time-division.

The method of the invention thus enables improving the spectral efficiency in the direction of transmission from the base station to the terminal equipment, by utilizing suboptimal detection of the signal of several information channels in the subscriber terminal equipment. The base station generally refers herein to a device that processes and further transmits information of several channels.

In the method of the invention, the information channels are brought into a strongly parallel form, which enables effective application of interference cancellation algorithms in the terminal equipments. Interference cancellation of a terminal equipment is linearly complex as a function of parallel information channels, which is not possible in a conventional CDMA system. A strongly parallel transmission enables a time-division transmission in the direction of transmission from the base station to the terminal equipment. The terminal equipment may then use time intervals that are free from transmission e.g. for monitoring other base stations or for processing the received signal more effectively.

BRIEF DESCRIPTION OF THE DRAWINGS

In the following, the invention will be described in greater detail with reference to the examples in accordance with the attached drawings, in which.

THE PREFERRED EMBODIMENTS OF THE INVENTION

Figure 1:
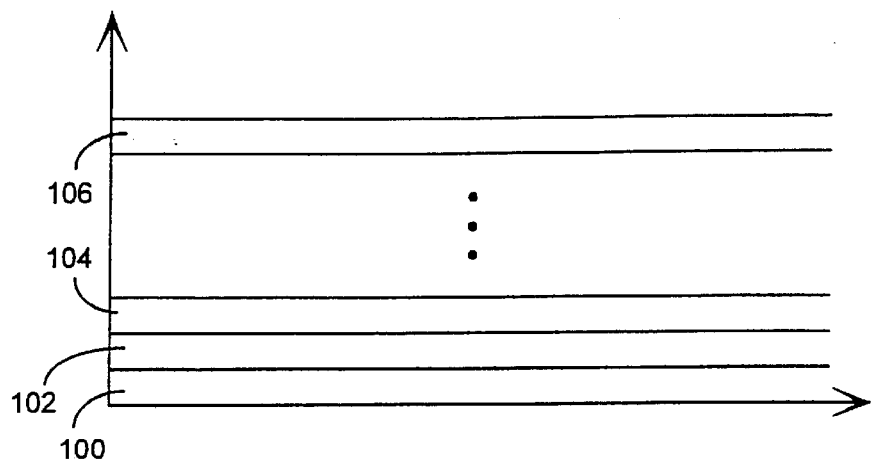
FIG. 1 illustrates a previously disclosed, prior art transmission technique.
Figure 2:
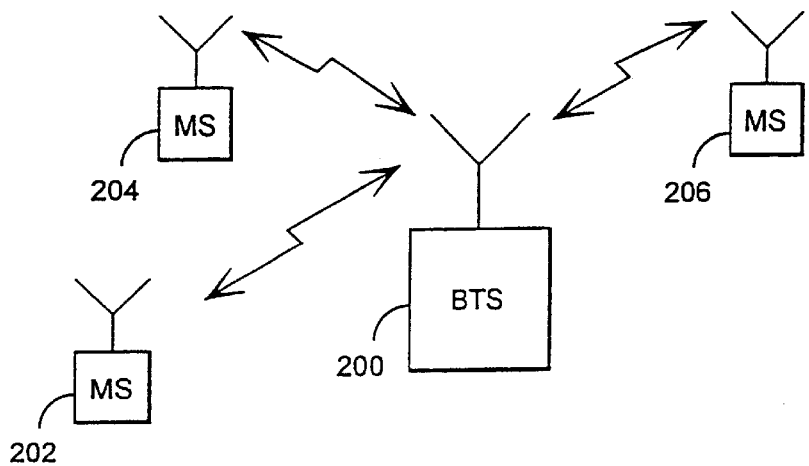
FIG. 2 illustrates an example of a cellular radio system in which the method of the invention may be applied.

FIG. 2 illustrates a part of the cellular radio system in which the method of the invention may advantageously be applied. A cellular radio network comprises in each cell at least one base station 200, and a number of subscriber terminal equipment 202–206 connected to the base station. The base station switches the calls from the terminal equipment via a base station controller, a mobile services switching center, or similar, to a public telephone network or another terminal equipment.

All terminal equipment transmit on the same frequency to the base station 200, which, in the solutions in accordance with the prior art, thus distinguishes the transmissions of different terminal equipment on the basis of the spreading code used by each terminal equipment. In the solution in accordance with the invention, the base station assigns from a group of available code sequences N codes to one user, and the user in question sends the information in parallel to the subscriber terminal equipment, the data transfer rate, however, substantially remaining the same. In the method of the invention, the base station thus transmits N symbols to the terminal equipment for each sequence of symbols, whereas in the conventional method, one symbol is transmitted. Since the data transfer rate substantially remains the same, the transmission of the symbols of the frame of each connection using several parallel transmissions does not last for the duration of the entire frame in the method of the invention. Thus, time-division may be applied among several users. Transmissions of several different users may be transmitted by using the same spreading codes, and the users may be distinguished from each other by means of time-division.

Figure 3A:
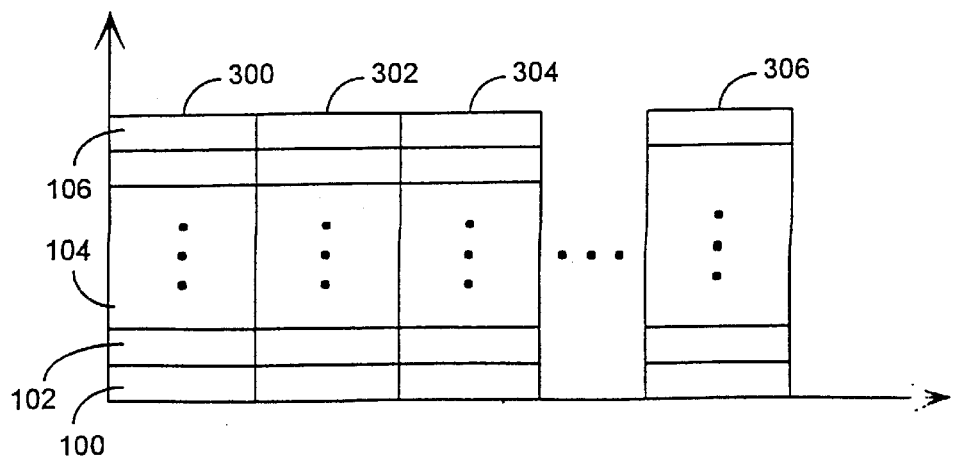
FIGS. 3a–3c illustrate different alternatives in accordance with the invention for distinguishing the signals of different users by means of time-division.

A possible embodiment of a parallel time-division transmission is illustrated in FIG. 3a, in which the horizontal axis represents time, and the vertical axis different spreading codes. In the example of the figure, signals 300–306 of each user are transmitted each in an individual time-slot, so that the symbols of each user are multiplied by a spreading code, in the case of the first user by codes 100–106. Different users may use different codes. Different users may also have a different number of codes.

The disclosed time-division parallel transmission method enables an advantageous implementation of interference cancellation algorithms in the subscriber terminal equipment. The signal incoming to the terminal equipment is in this case a utility signal, not a multiple access interference signal. Furthermore, the terminal equipment has less parameters to be estimated: L*M, in which L represents the number of paths, and M the antenna diversity. The terminal equipment may further carry out interference cancellation using the same algorithms as the base station, since the terminal equipment has the capability to process the arrived transmission during the period of time when signals intended for other terminal equipment are being transmitted. Interference cancellation of the terminal equipment is linearly complex as a function of the number of the parallel transmissions.

During those time periods when the base station is transmitting the signal intended for other terminal equipment, the base station may monitor the transmission of other base stations. Parallel transmission also enables the terminal equipment to send the base station, on the signalling channel, the information whether the received signal has been subject to strong fading, or whether the detection of the signal has failed for some other reason. The base station may then allocate the terminal equipment in question a new time period, signal it to the terminal equipment and make a new attempt at transmitting. The re-transmission may also be carried out by means of so-called puncturing, i.e. by re-transmitting the information in parallel at such a moment of time that originally was reserved for some other connection. The connection in question then loses part of its information.

In the solution of the invention, a parallel transmission may be implemented in a number of ways.

Generally, different users may have a different number of parallel channels at different moments of time. One possibility is the manner already disclosed above to assign each user an individual time-slot. This demands an accurate coordination of the base station, but an advantage is that the terminal equipment do not cause interference for each other. A disadvantage is, however, that high-power signals increase the peak power of the transmission of the base station. High-speed and high-power connections may use several time-slots.

Figure 3B:
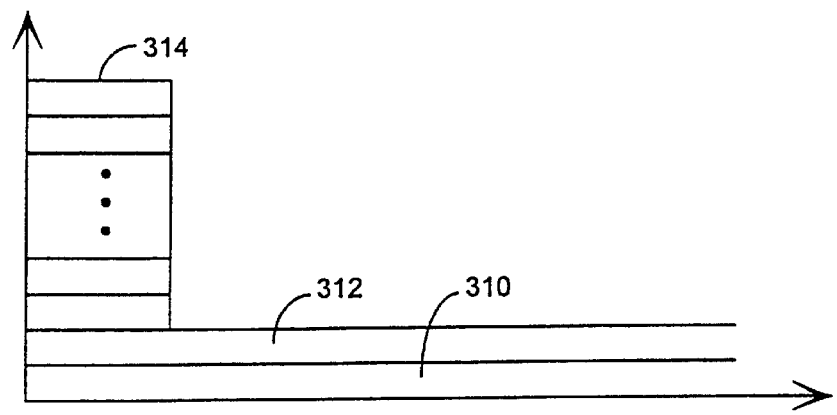

Another possibility is that just a few users transmit in parallel, and other users apply the conventional transmission. This manner is illustrated in FIG. 3b, in which there is one user 314 applying parallel transmission by utilizing several spreading codes, and the other users 310, 312 transmit an entire frame by using one spreading code. In a solution of this kind, user 314 transmitting in parallel interferes with other users, but, by assigning the parallel user a sufficient number of spreading codes, the interference may be limited to the duration of just a few symbols, and the interference may thus be eliminated by means of channel coding. Parallel transmission in accordance with this solution is suited for use in particular in such a situation in which the user is in the vicinity of the base station, and the transmission is carried out to said user with a low power due to favourable interference conditions. These users may utilize interference cancellation methods for attenuating high-power interferences.

Figure 3C:
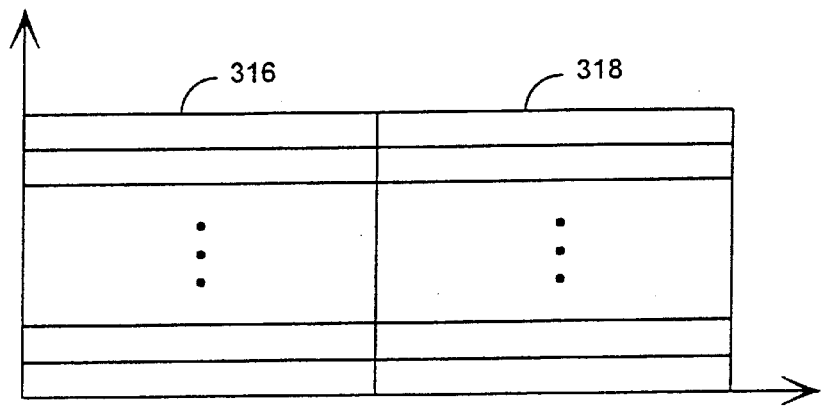

Another possibility is to divide the users into two or more groups and assign an individual time-slot for the transmissions of each group. This is illustrated in FIG. 3c, in which the users are divided into two groups 316 and 318, which are distinguished from each other by means of time-division. Within the groups, the spreading codes of the users differ from each other, and the members of the groups may have a different number of codes available.

Another possibility is to assign time-slots to each user in order in accordance with a desired code. Interferences between the cells are thus randomized.

Figure 4:
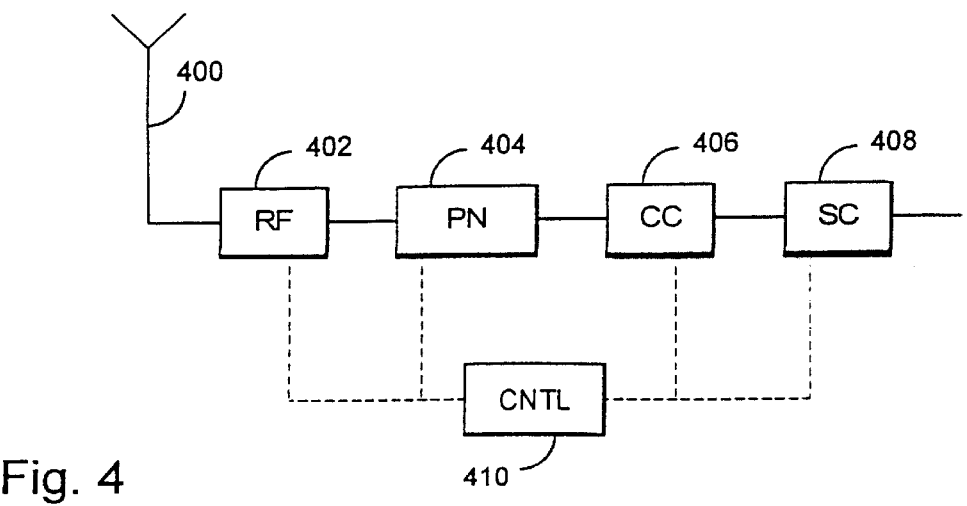
FIG. 4 is a block diagram illustrating the structure of the base station of the cellular radio system of the invention.

Let us now study the structure of the cellular radio system of the invention by means of the block diagram of FIG. 4. A transmitter comprises a coder 408, in which speech coding is carried out for a signal to be transmitted, and a channel coder 406, in which channel coding is carried out for the speech coded signal. Thereafter, the channel coded signal is applied to means 404, in which the data signal to be transmitted is multiplied by a spreading code in ways known to a person skilled in the art. In the transmitter of the invention, the signal of the user is multiplied in means 404 by more than one spreading codes, and it is distinguished by means of time-division from the signals of at least some of the users. In view of technique, time-division transmission may be implemented in the same way as in known TDMA systems. The signal obtained in this way is further applied via a radio frequency means 402 to be transmitted by means of an antenna 400.

The transmitter further comprises control and calculation means 410, which control the operation of the elements mentioned above. The control and calculation means are typically implemented by means of a processor. The control means may also be implemented by means of other electronic components, such as discrete logical components. The apparatus naturally comprises other components than those shown in the figure, such as filters and converters, as is obvious to a person skilled in the art, but for the sake of clarity they are not shown in the figure.

The transceiver of the cellular radio system of the invention comprises means 404 for multiplying the symbols to be transmitted by one or more spreading codes. Multiplication with the spreading code is carried out in manners directed per se to persons skilled in the art.

Figure 5:
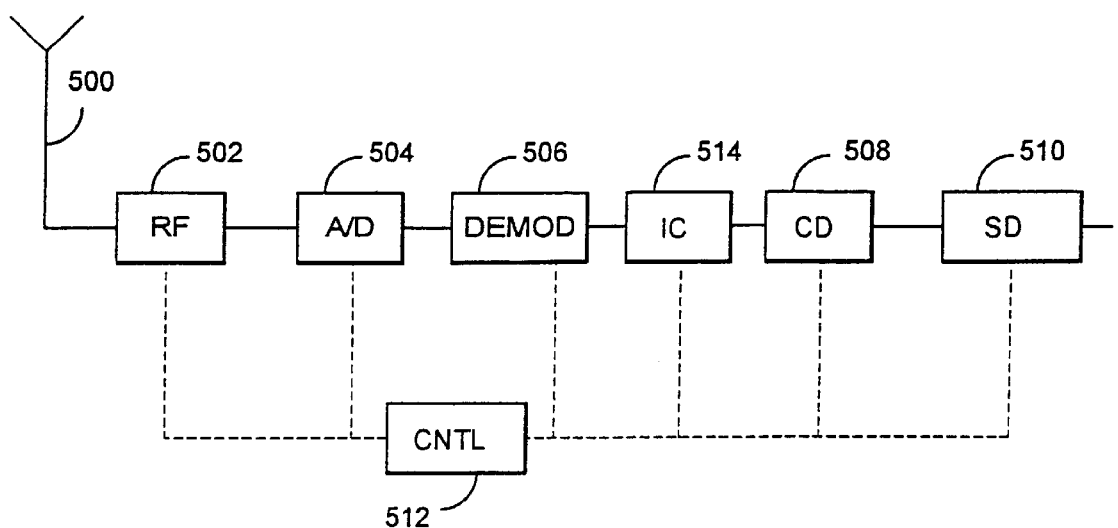
FIG. 5 is a block diagram illustrating an example of the structure of the terminal equipment of the cellular radio system of the invention.

FIG. 5 is a block diagram illustrating the overall structure of the CDMA terminal equipment receiver in accordance with the invention. The receiver comprises an antenna 500, by means of which the received signal is applied via radio frequency elements 502 to a converter means 504, in which the received signal is converted into a digital form. The signal digitized in this way is further applied to demodulation means 506, in which the signal is correlated with the used spreading codes. The output signal 506 of the demodulation means, which is returned onto the original narrow band, is applied to interference cancellation means 514, in which interference cancellation is carried out for the signal by means of known interference cancellation methods. The signal purged of interferences is applied to a channel decoder 508 and from there to other elements of the receiver, such as a speech decoder 510.

The receiver further comprises control and calculation means 512, which control the operation of the elements mentioned above. The control and calculation means are typically implemented by means of a processor. The control means may also be implemented by means of other electronic components, such as dedicated logic. The apparatus naturally also comprises other components than those shown in the figure, such as filters and converters, as is obvious to a person skilled in the art, but for the sake of clarity they are not shown in the figure.

Although the invention has been disclosed above with reference to the example in accordance with the attached drawings, it is obvious that the invention is not limited thereto, but it can be modified in various ways within the scope of the inventive idea set forth in the attached claims.

What is claimed is:

1. A data transmission method in a cellular radio system, the cellular radio system comprising at least one base station in each of a plurality of cells, and a plurality of subscriber terminal equipment connected to at last one of the at least one base station, the method comprising:

multiplying a signal of each user by a plurality of pseudorandom sequences, different symbols of each of the respective signals being multiplied by a different one of the pseudorandom sequences; and distinguishing the respective signals of each of the users multiplied by a same one of the pseudorandom sequences by using time-division, wherein:

a data transfer rate of each of the signals remains substantially unchanged.

2. The method of claim 1, further comprising assigning an individual time slot to a transmission of each of the users, respectively.

3. The method of claim 1, further comprising:

dividing the users into at least two groups; and assigning a respective individual time slot to transmissions of each of the groups.

4. The method of claim 1, further comprising assigning time slots to each user in accordance with a desired code.

5. The method of claim 1, further comprising assigning a plurality of time slots to a transmission of a user requiring one of a large capacity and a high transfer rate.

6. The method of claim 1, wherein each of the users continuously receives a signal multiplied by an individual pseudorandom sequence.

7. The method claim of 1, wherein the method is applied in a direction of transmission from the at least one base station to the subscriber terminal equipment.

8. The method of claim 7, further comprising a receiver processing a received one of the signals during a time slot in which the receiver does not receive any of the signals.

9. The method of claim 7, further comprising carrying out interference cancellation for a received one of the signals.

10. The method of claim 7, further comprising a receiver monitoring transmissions of adjacent ones of the at least one base station during time slots in which the receiver does not receive any of the signals.

11. A cellular radio system, comprising:

a plurality of cells, each of the cells comprising:
at least one base station, and
at least one subscriber terminal equipment, each of the at least one subscriber terminal equipment connected to the at least one base station;

a transmitter, comprising:
a mechanism to multiply a respective signal of each of a plurality of users by a plurality of pseudorandom sequences, each of the signals including symbols;

a transceiver comprising:
a mechanism to multiply different symbols of each of the respective signals by a different one of the pseudorandom sequences, a data transfer rate of each of the signals remaining substantially unchanged, and
a mechanism to distinguish, by use of time division, signals of different ones of the users, the signals of the different ones of the users being multiplied by a same one of the pseudorandom sequences.

12. The cellular radio system of claim 11, wherein the transceiver of the system comprises a mechanism to transmit, in individual time slots, the respective signal intended for each of the users.

13. The cellular radio system of claim 11 wherein the transceiver of the system comprises a mechanism to divide the users into at least two groups and to transmit signals of each group in individual time-slots.

14. The cellular radio system of claim 11, wherein the transceiver is a base station transceiver.

15. The cellular radio system of claim 14, wherein a receiver of the subscriber terminal equipment of the system comprises a mechanism to perform interference cancellation.

\* \* \* \* \*